(12) United States Patent
Beaupré-Laflamme et al.

(10) Patent No.: US 11,772,280 B2
(45) Date of Patent: Oct. 3, 2023

(54) PORTABLE SUCTION DEVICE CARRIER FOR ASSEMBLY PROCESSES

(71) Applicant: Ciena Corporation, Hanover, MD (US)

(72) Inventors: Raphael Beaupré-Laflamme, Quebec (CA); Simon-Pierre Pelletier, Quebec (CA)

(73) Assignee: Ciena Corporation, Hanover, MD (US)

( * ) Notice: Subject to any disclaimer, the term of this patent is extended or adjusted under 35 U.S.C. 154(b) by 313 days.

(21) Appl. No.: 17/321,665

(22) Filed: May 17, 2021

(65) Prior Publication Data
US 2022/0362947 A1     Nov. 17, 2022

(51) Int. Cl.
*B25J 15/06* (2006.01)

(52) U.S. Cl.
CPC ......... *B25J 15/0625* (2013.01); *B25J 15/065* (2013.01); *B25J 15/0683* (2013.01)

(58) Field of Classification Search
CPC .......... B25J 15/0625; B25J 15/0633; B25J 15/0641; B25J 15/065; B25J 15/0658; B25J 15/0683; B66C 1/0218; B25B 11/005
USPC ................................. 294/186, 187
See application file for complete search history.

(56) References Cited

U.S. PATENT DOCUMENTS

| | | | | |
|---|---|---|---|---|
| 3,743,340 A | * | 7/1973 | Williamann | B66C 1/0212 294/186 |
| 4,674,784 A | * | 6/1987 | Wooley | B65G 47/91 414/752.1 |
| 5,470,117 A | * | 11/1995 | Schmidt | B66F 9/181 294/185 |
| 5,913,104 A | * | 6/1999 | Piper | B25B 11/005 438/18 |
| 5,950,670 A | * | 9/1999 | Flaim | B25B 11/005 137/515.7 |
| 5,960,821 A | * | 10/1999 | Johnson | B25B 11/007 137/460 |
| 9,159,595 B2 | | 10/2015 | Hurley et al. | |
| 9,764,479 B2 | * | 9/2017 | Cho | F04F 5/22 |
| 9,950,432 B1 | * | 4/2018 | Huang | B25J 15/0616 |

* cited by examiner

*Primary Examiner* — Dean J Kramer
(74) *Attorney, Agent, or Firm* — Young Basile Hanlon & MacFarlane, P.C.

(57) ABSTRACT

Disclosed herein is an apparatus that includes a housing including a first opening and a second opening. The first opening forms a suction connection with a transportable component. The apparatus includes a valve connected with the second opening a channel defined within the housing. The channel extends between the first opening and the second opening. The apparatus includes a vacuum maintaining mechanism disposed within the channel, and the vacuum maintaining mechanism holds a partial vacuum within the channel.

25 Claims, 8 Drawing Sheets

PORTABLE SUCTION DEVICE CARRIER FOR ASSEMBLY PROCESSES

TECHNICAL FIELD

This disclosure relates to a portable carrier capable of holding a suction for a period of time so that small components can be easily moved through assembly processes.

BACKGROUND

Assembly of electrical or optical devices with small components, such as in cameras, phones, or computers, involves intricate assembly plans with many components. The devices utilize varying adhesives and assembly techniques which may require holding components for varying periods of time in a single position. These components can have varying compositions including polymers, ceramics, glass, metal, or some combination of those components that cause challenges with handling. This can be problematic where a component includes non-metallic components in an amount which causes the component to be non-magnet (e.g., optical glass components) so that magnet techniques are unusable in moving the components from one assembly station to another. Other techniques to mitigate this issue include utilizing clamps or continuous vacuum hose devices to hold and move components between assembly areas. However, clamps may be inconvenient in some situations in which the clamps are too clunky to use in tight spaces of small electrical devices (e.g., cameras), and continuous vacuum devices that use a constant vacuum source (e.g., from a hose) may also be inconvenient in some situations by interfering with crisp assembly of small electrical devices.

SUMMARY

In one aspect, an apparatus includes a housing includes a first opening and a second opening. The first opening forms a suction connection with a transportable component. The apparatus includes a valve connected with the second opening and a channel defined within the housing. The channel extends between the first opening and the second opening. The apparatus includes a vacuum maintaining mechanism disposed within the channel. The vacuum maintaining mechanism holds a partial vacuum within the channel, after a vacuum source has withdrawn air from the channel when the transportable component is connected with the apparatus.

The housing may include a third opening connected with the channel. The third opening may include a release mechanism which allows fluid to travel into the channel and to relieve a suction between the apparatus and the transportable component. The valve may include a check valve that is configured to restrict fluid flow once the suction connection is formed between the apparatus and the transportable component. The valve may include a sensor or may connect with a sensor that detects whether the suction connection is formed between the apparatus and the transportable component. The vacuum maintaining mechanism may include one or more of a diaphragm, a spring-piston, a foam, a rubber, any component sufficient to deform and store mechanical energy, or any combination thereof. The release mechanism may include one or more of a check valve, an electromagnet, a twist release valve, a pin activated release, any type of force actuated valve, or any combination thereof. The first opening may include a seal positioned on an outer surface of the housing, and the seal may assist with the suction connection between the apparatus and the transportable component at the first opening. The valve may be a check valve to allow flow of fluids from the inside of the channel to an external environment so that a vacuum is formed within the channel. When the apparatus is contacted with the transportable component at the first opening and is connected with a vacuum source at the valve, the valve may form a partial vacuum within the channel having a pressure of about 0.0.1 atm to about 0.99 atm so that the suction connection is formed between the transportable component and the apparatus. When the apparatus is contacted with the transportable component at the first opening and is connected with a vacuum source at the valve, the apparatus may hold a vacuum or a partial vacuum with the transportable component when disconnected from the vacuum source. The apparatus may further include locators positioned on an outer surface of the housing and proximate to the first opening, the locators configured to align to the shape of the transportable component and configured to assist with a suction connection between the apparatus and the transportable component.

In another aspect, in general, an apparatus includes a housing defining a channel extending between a first opening, a second opening, and a third opening. The first opening provides a suction connection between the apparatus and a component. The apparatus includes a valve connected with the second opening that allows fluids to exit the channel. The apparatus includes an release mechanism positioned at the third opening that relieves suction between the component and the apparatus upon engagement.

The apparatus may further include a suction retention device disposed within the channel that mechanically retains a vacuum within the channel. The release mechanism may be a check valve configured to crack under a pressure of 1.0 atm or more so that the suction connection between the apparatus and the component is released. The release mechanism may be a magnet sealable against or within the third opening. The magnet may release the suction connection between the apparatus and the component when engaged with an electromagnetic force. The third opening may separate the channel and a release drain, and the release drain may include a fourth opening to the outside environment and a release wall. When the magnet is engaged by attraction of an electromagnetic force, the magnet may be pulled from the third opening to the release wall so that the suction connection between the apparatus and the component is released.

In another aspect, in general, a system for connecting a carrier and a component that includes a carrier, and the carrier includes a body defining a channel with a first opening and a second opening to an external environment. The first opening is sealable against the component and capable of forming a suction connection between the carrier and the component. The carrier further includes a check valve connected with the second opening that withdraws fluids from the channel. The system further includes a pumping station connectable with the carrier at the check valve, the pumping station configured to withdraw fluids from the channel. The pumping station or the check valve detect whether the suction connection has formed between the carrier and the component and to stop withdrawing fluids when the suction connection is formed.

The pumping station may include a sensor to detect whether the suction connection has formed between the carrier and the component, and the pumping station may stop withdrawing fluids once the suction connection is formed. The carrier may further include a release check valve positioned at a third opening of the channel, the release check valve configured to crack at a pressure of about 1.0 atm or more and allow fluids to enter the channel so that the suction connection between the carrier and the component is released. The system may include locators disposed on an outer surface of the body and proximate to the first opening, and the locators configured to position the component over the first opening to form or maintain a sealable connection at the first opening so that the suction connection is formable between the carrier and the component. The carrier may further include a vacuum retainer disposed within the channel, and the vacuum retainer may mechanically maintain a partial vacuum within the channel. The vacuum retainer may have a form that is elastic, and the vacuum retainer may be capable of retaining a partial vacuum within the channel by deforming as the pressure is lowered within the channel.

Aspects can have one or more of the following advantages.

The present disclosure provides apparatuses and systems that can hold a constant suction with a component without the continuous engagement of a vacuum hose, which is advantageous to avoid a significant hose configurations that can cause interface with assembly of electronic or optical devices.

The apparatuses and systems disclosed herein provide mechanisms to hold the vacuum within a closed channel for a significant period of time, such as between twelve hours and 21 days. This provides a user ample time to connect a component with a larger device, like an electronic and/or optical device that has tight inner space and delicate components.

The apparatuses and systems provide a holdable suction force strong enough to hold a component on the apparatus without damaging or leaving an adhesive residue on the component. For example, the apparatuses and systems allow for long term holding within a device so that adhesive can activate between the component and the device and released when desired without other deleterious residues left behind on the apparatus.

The apparatuses and systems provide an release mechanism that, once a vacuum is holding the component tot the apparatus, allows a quick release of the component from the apparatus without damaging or jostling the component that is assembled within a tight space of an electrical or optical device.

The apparatuses and systems provide techniques for creating the vacuum force by withdrawing fluids from the channel that is stoppable so that the component is not damaged while creating a sufficient vacuum force to hold the component. With this technique, the suction force can be created without damaging the component and a vacuum retainer can be used in combination to hold the component in place for extended periods of time.

As the apparatuses and systems used herein utilize the principle of vacuums or partial vacuums to hold the component on the apparatuses, the apparatuses and/or systems are completely reusable and need little or no maintenance for repeated operation.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
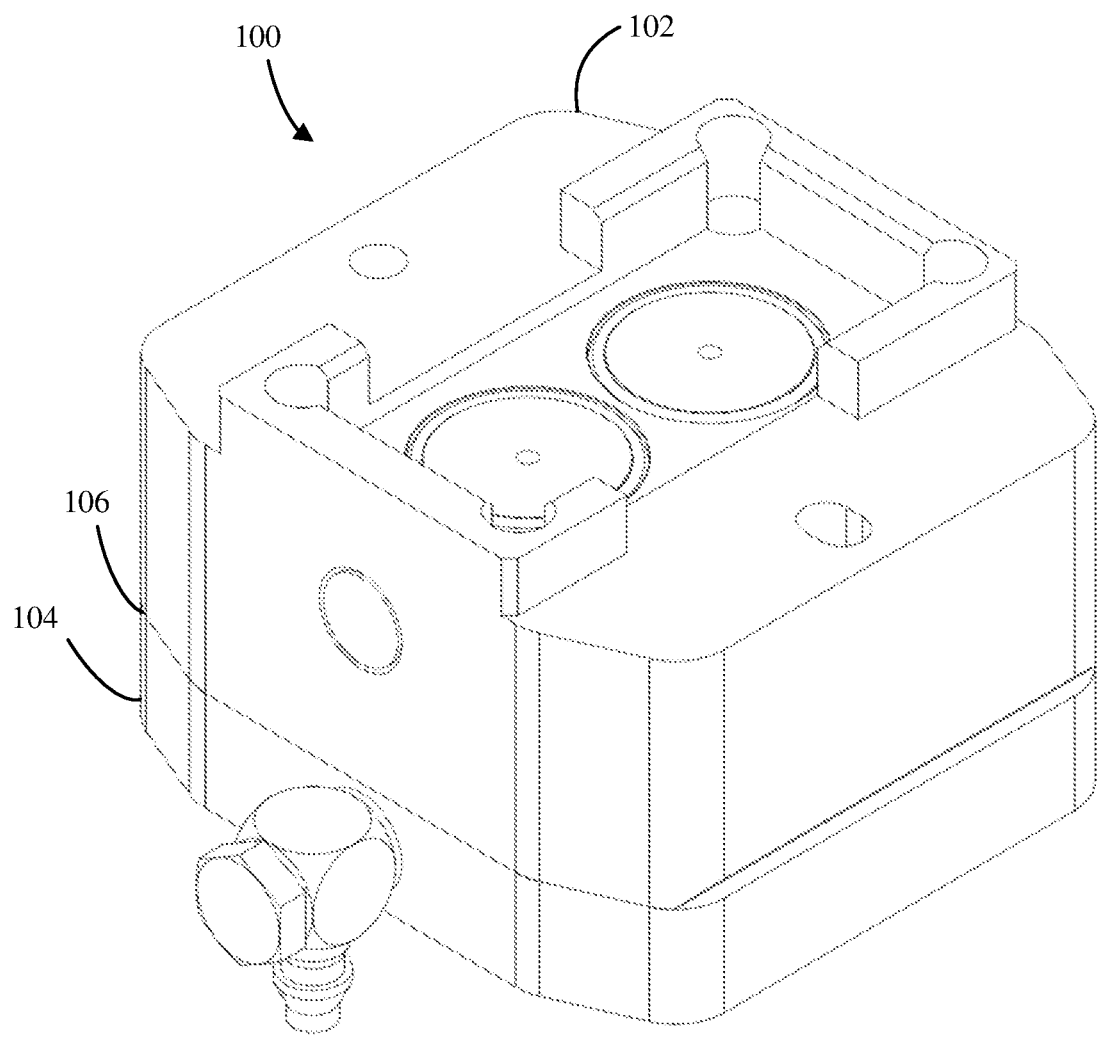
FIG. 1A is a perspective view of a suction system connecting a carrier and a pumping station to form a suction connection.

Fluids as used herein include any gaseous, liquid, or liquid/gas combination composition, such as ambient air or water. Component as used herein can include anything that is used for assembly in a device with additional components, for example, photonic packages, wafers, fiber arrays, electronic dies, electronic components, photonic dies, ferules, lenses, any other component used in an electrical or optical device, or any combination thereof. The vacuum retainer may be described as a retaining mechanism, a vacuum holding mechanism, a vacuum maintaining mechanism, or a suction retention device, and the vacuum retainer may be any component or device sufficient to mechanically hold a vacuum or partial vacuum within a channel. A carrier may be described as a device, apparatus, traveler, vacuum holder, or any combination thereof. A suction system may be described as a pairing of a pumping and/or detachment or release station and a carrier. A valve as used herein is any pathway that can be mechanically opened or closed to form a fluid communication between two areas. A vacuum or partial vacuum as used herein has a pressure of less than 1 atm. A vacuum has a pressure of 0.0 atm. A partial vacuum has a pressure between about 0.01 atm to about 0.99 atm.

In some of the approaches described herein, a carrier is used to hold a component in place while moving the component between assembly areas. To form the vacuum, a pumping of any type may be connected to the carrier and pump until a sensor or detector that a sufficient vacuum has formed within the channel such that a suction connection has been formed between the carrier and the component. The sensor or detector may be positioned anywhere on the carrier or pumping station, such as on a vacuum retainer, a locator, a valve, vacuum source, or any combination thereof.

Once a suction connection (i.e., vacuum or partial vacuum) is formed between the carrier and the component, no vacuum hoses are used to hold the suction force because a valve prevents fluids from flowing back into a channel of the carrier. For additional time of holding the vacuum or partial vacuum, a retention device that is disposed within the channel can mechanically hold the vacuum within the channel longer by mechanically withdrawing into the channel. For example, the retention device could be a piston or a diaphragm that mechanically holds the vacuum by deforming or moving into the channel during formation of the vacuum, and once a vacuum is formed, the retention device may increase the volume of the channel over time by deforming or moving away from the channel.

To release the vacuum, a release mechanism may be connected, contacted, or interfaced with the carrier to engage a system that releases the vacuum in a way that prevents damage or movement of the component and the carrier. For example, a releasing check valve may be activated by "cracking" the valve and releasing the vacuum, or a magnet system may be used that is sealed against the channel and is release upon engagement of another attracting magnet, such as an electromagnet, that is activated automatically or upon manual engagement by a user. With these techniques, a component can be connected with the carrier, safely carried to a destination for connection or attachment with a larger device, connected with an internal portion of an intricate device that has very little open space within the device, and effectively released so that the delicate component is connected to the device without additional user aid.

Figures 1B, 1C:
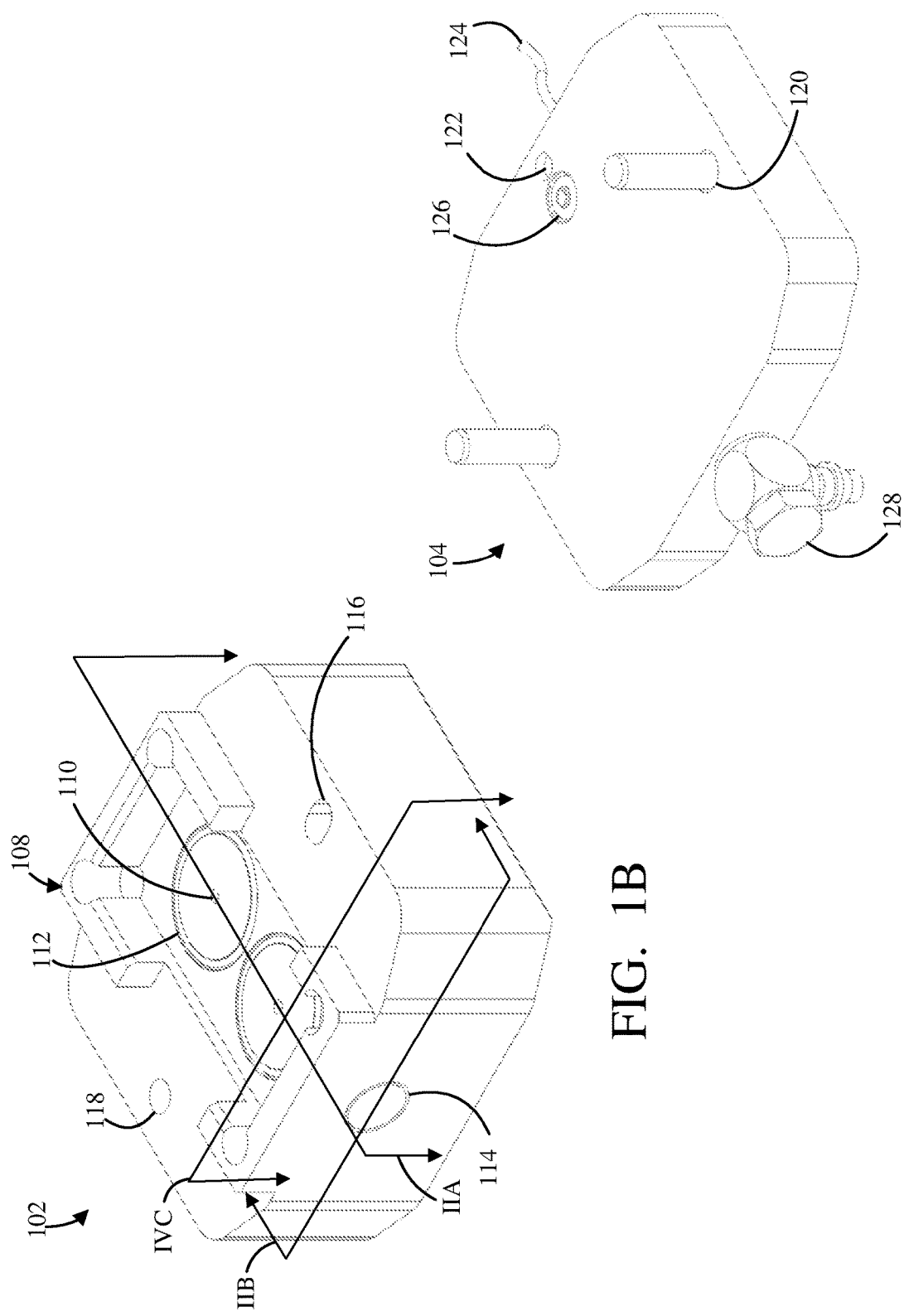
FIG. 1B is a perspective view of a carrier connectable with the pumping station of FIG. 1A.
FIG. 1C is a perspective view of the pumping station connectable with the carrier of FIGS. 1A-B.

FIG. 1A is a perspective view of a suction system 100 connecting a carrier 102 and a pumping station 104 to form a vacuum interface 106. FIG. 1B is a perspective view of a carrier 102 connectable with the pumping station 104 of FIG. 1A. FIG. 1C is a perspective view of the pumping station 104 connectable with the carrier 102 of FIGS. 1A-B. FIGS. 1A-1C are described in combination to show the interaction of the combination of the pumping station 104 and the carrier 102. The carrier 102 includes a locator 108, openings 110, seals 112, a plug 114, and slots 116, 118. The pumping station 100 includes dowels 120, a proximity sensor 122, an electric connection 124, and a pumping channel 126 leading to a vacuum pump 128.

The locator 108 is positioned on a top surface of the carrier 102 to align a component (see e.g., component 302 of FIG. 3) with the openings 110 for forming the suction connection between the component and the carrier 102. The locator 108 has the shape of a rectangle with a flat bottom to accommodate a component with a flat surface, such as a rectangular piece of glass. In other examples, the locator 108 may be shaped or positioned to accommodate any bottom surface shape of a component so that a suction connection can be formed between a component and the carrier 102. For example, the locator may be shaped to accommodate bottom surfaces that are shaped as bowls, shelves, cones, pyramids, spheres, or any combination thereof. The side walls of the locators 108 may be any shape sufficient to align the component to the openings 110.

Adjacent to the openings 110, the seals 112 are positioned around each opening 110 to assist with forming the suction connection. The suction connection is airtight so that a component and the carrier can hold a vacuum or partial vacuum for an extended period of time. For example, the period of time that the component and the carrier hold a vacuum or partial vacuum may be between about twelve hours and about seven days. Below a surface of the openings 110, the plug 114 closes off a channel (See channels 204, 304, 404 of FIGS. 2A, 3, and 4A) so that the channel does not have entry of undesired fluids (e.g., ambient air from an external environment), which would negatively impact the suction connection between the component and the carrier 102. Two openings 110 are shown in FIGS. 1A-1B, and any number of openings 110 may be included to form a suction connection between a component and the carrier 102. For example, the carrier 102 may include between one opening and ten openings that are each attached to the same channel.

The seals 112 may be arranged in any manner sufficient to provide an airtight seal when assisted by a suction connection at the openings 110. For example, the seal 112 may be an O-ring, a custom gasket, or any combination thereof. The seal 112 may be any material sufficient enough to prevent fluid communication into the channel (not shown) or openings 110. For example, the seal 112 may be a rubber.

At the top surface of the carrier 102, the slots 116, 118 extend perpendicularly through the carrier 102 to a bottom surface (not shown) so that the carrier 102 is align-able with the dowels 120 and a pumping valve (not shown). The slots 116, 118 may partially or fully extend through the carrier in any manner or shape so that the slots 116, 118 are connectable with the dowels 120 and can align an opening (see e.g., 206b of FIG. 2A) with the pumping valve of the pumping station 104.

Figure 2A:
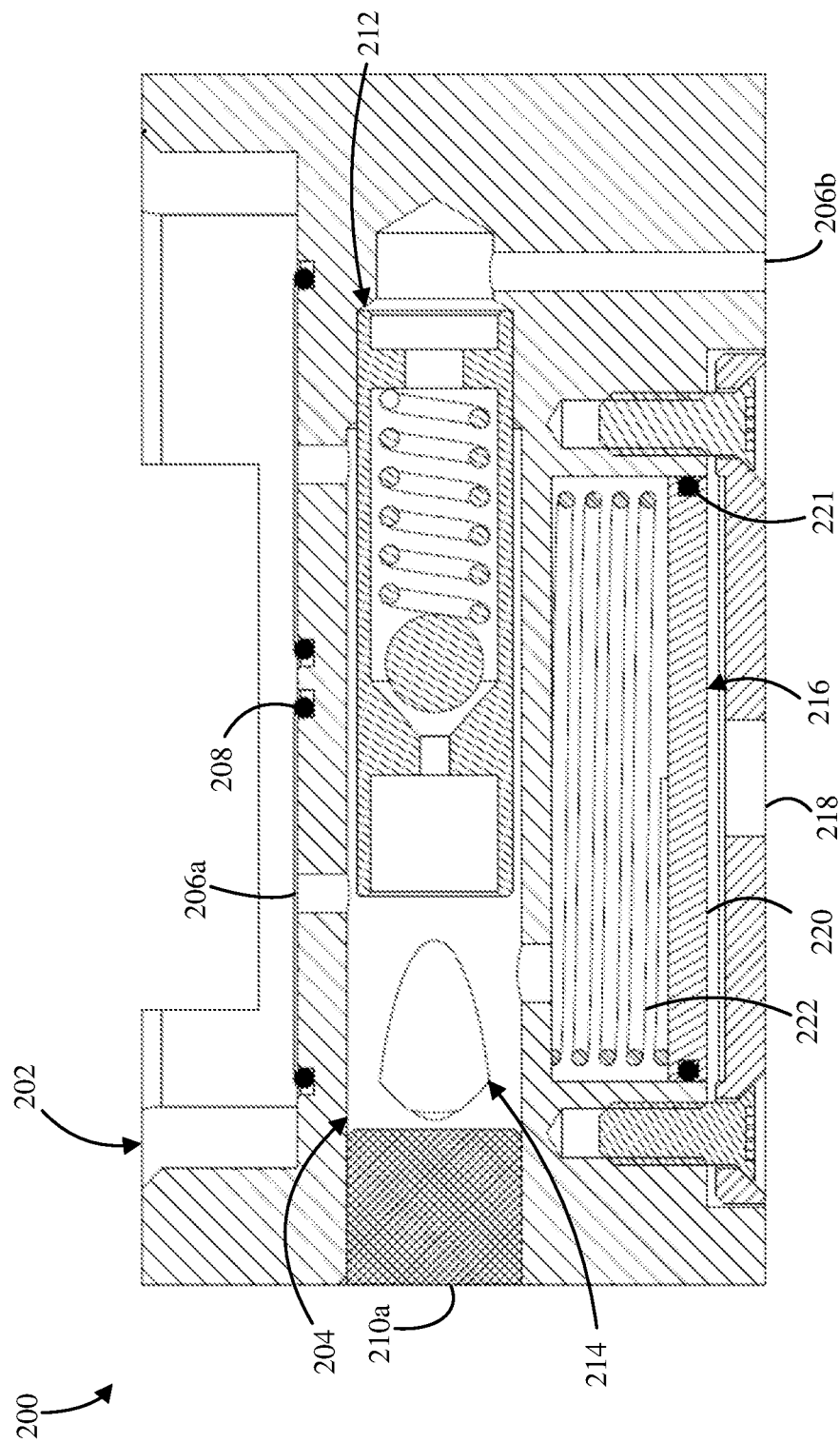
FIG. 2A is a cross-sectional view of the carrier along line IIA of FIG. 1B.

When the pumping station 104 and the carrier 102 are connected at a vacuum interface 106, the pumping channel 126 is releasably secured to the opening (not shown, 206b of FIG. 2A). The vacuum interface 106 may be a simple connection between the dowels 120 and the slots 116, 118 and/or pumping channel 126 and the opening, or the vacuum interface 106 may include other connection means that can withdraw or pump fluids out of or into the carrier 102. The connection between the pumping station 104 and the carrier 102 may be any interface sufficient to connect the two devices so that fluids can be withdrawn from the channel 106. For example, the connection between the pumping station 104 and the carrier 102 may be a quick connecting interface like a barbed connection, twist to lock, push to connect, a gasket, or a flat surface with an O-Ring.

The pumping channel 126 is connected with the vacuum pump 128 to withdraw fluids from the channel (not shown, channel 204 FIG. 2A) of the carrier 102 to the pumping station 104 so that a vacuum can be formed. The pumping channel 126 may have any configuration sufficient to withdraw the fluids from a channel and create a suction connection between a component and the carrier. In other examples, another pumping valve (not shown) can be included that the pumps fluids into the carrier 102 to force the release of the vacuum connection between the carrier 102 and a component. With this configuration, the pumping station 104 can both withdraw and pump fluids from or to the carrier 102 in the same pumping station 104, which cuts down on the number of components used in operation of the suction system 100 and/or a release/detachment system (see e.g., FIGS. 2C and 4B).

Adjacent to the pumping channel 126, the proximity sensor 122 is positioned to detect whether the carrier 102 is connected with the pumping station 104. The proximity sensor 122 is integrated within the pumping station 104 and connects with power and any other device through the electrical connection 124. In some examples, the proximity sensor 122 is integrated with the pumping channel 126, and the proximity sensor 122 can also detect whether a sufficient vacuum or partial vacuum has been formed within the channel (not shown, channel 204 of FIG. 2A) and/or a suction connection between the carrier 102 and a component (not shown, component 302 of FIG. 3).

Figure 2B:
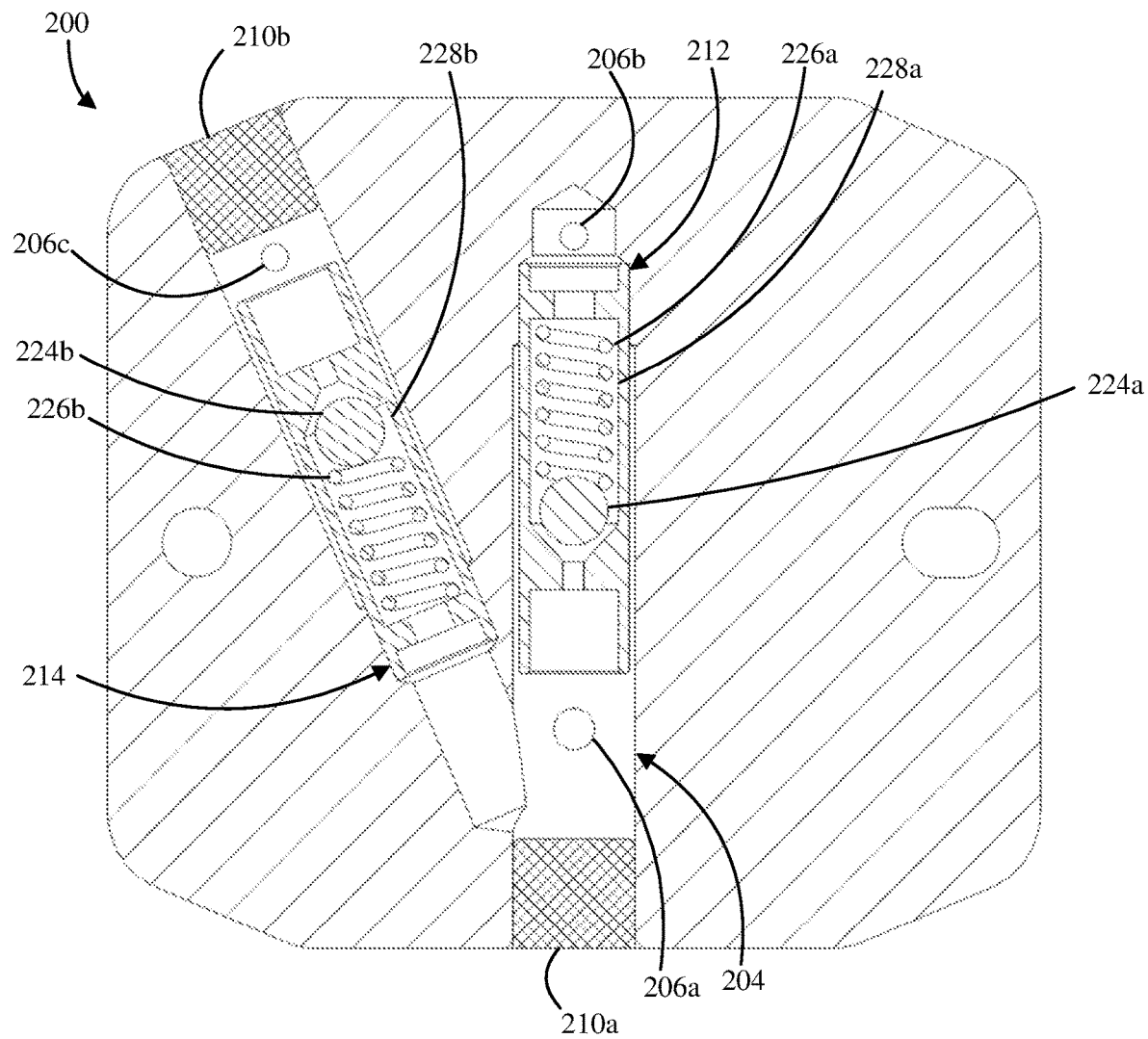
FIG. 2B is a cross-sectional view of the carrier along line IIB of FIG. 1B.

FIG. 2A is a cross-sectional view of the carrier 200 along line IIA of FIG. 1B. FIG. 2B is a cross-sectional view of the carrier 200 along line IIB of FIG. 1B. A locator 202, similar to the locator 108 of FIG. 1B, is positioned on a top surface of the carrier 200 for connection with a component (not shown) through suction connection of a channel 204 at opening 206a. In other examples, one opening 206a or more than two openings 206a are used to for a suction connection with the component (not shown).

Another opening 206b provides an outlet to draw fluids (i.e., air) from the channel 204 to form the suction connection between a component and the carrier 200. To release the fluids from the channel 204 when there is a suction connection between the carrier 200 and a component, another opening 206c (FIG. 2B) is provided a space away from on a same surface as the opening 206b. The openings 206b, 206c are positioned on a bottom surface of the carrier 200, and in other examples, the openings 206b, 206c may be positioned on any surface of the carrier 200 that provides separate exit and entry pathways for fluids. In other examples, a single opening (not shown) is used to move fluids in and out of the channel.

Plugs 210a (FIG. 2A), 210b (FIG. 2B) are affixed to portions of the channel 204 so that valves 212 (FIG. 2A), 214 (FIG. 2B) are insertable into the channel 204 during assembly of the carrier 200. Both plugs 210a, 210b form connections that are airtight with the channel 204 so that the channel 204 has no fluid communication with the external environment except at the openings 206a, 206b, 206c. The plugs 210a, 210b are secured by any means sufficient to form an airtight seal at the channel 204. For example, the plugs 210a, 210b may be screwed or glued into the channel 204.

Within the channel 204, a vacuum retainer 216 is disposed that functions to mechanically retain a vacuum or partial vacuum within the channel 204 when the locator 202 and/or openings 206a have a suction connection with a component (not shown). Below the vacuum retainer 216, another opening 218 is included that allows fluids to flow into a space below a wall 220, and the space below the wall 220 is free of fluid communication with the channel 204. In other words, the wall 220 separates the external environment and the channel 204. In this example, the vacuum retainer 216 is a piston that includes the wall 220 to form an airtight connection with the carrier 200 at seals 221. In other examples, the vacuum retainer 216 may be any device capable of mechanically retaining a vacuum within the channel 204 for an extended period of time, such as between 12 hours and 21 days. As fluids are withdrawn through the opening 206b, the wall 220 is drawn further within the channel 204 and is mechanically held by a spring 222 of the vacuum retainer 216. In other examples, the wall is mechanically held by any other deformable component sufficient to store mechanical energy, such as a foam, rubber, diaphragm, any component with deformable properties, or any combination thereof.

With this configuration, the vacuum retainer 216 can hold the suction connection between the component and the openings 206a for a longer period of time, as the vacuum retainer 216 can provide an elastic/mechanical property to the system that enhances vacuum retention properties. Pressure within the channel 204 can be predicted by the following formula $$P = \frac{nRT}{V} \quad \text{Formula I}$$

Where P is pressure, n is the number of gas atoms, T is temperature, R is the ideal law constant, and V is volume. In case of a leak, the number of gas atoms n increases in the chamber. If the volume V is constant, P increases proportionally.

One way to mitigate this is to increase the volume V. When the channel 204 is being purged of fluids, the initial energy of withdrawing fluids from the channel 204 is stored as potential energy in the vacuum retainer 216 by deforming, moving, or pulling the wall 220 inward towards the channel 204. With the vacuum retainer 216 having elastic properties, the volume increases as the pressure in the system rises by moving the wall 220 of the vacuum retainer 216 outward. Even if the mechanical movement of the vacuum retainer 216 is not at the optimal rate, the increase in volume within the channel 204 will slow the pressure rise (i.e., the loss of vacuum). In other words, the increase in volume is a function of pressure within the carrier 200 and the force exerted by the vacuum retainer 216. This principle can be applied to any vacuum retainer 216, for example, the piston described above, the diaphragm described herein, or any other vacuum retaining device.

The valve 212 that functions to allow fluid flow between the channel 204 and the external environment. In this example, the valve 212 is a check valve that allows fluids to exit the channel 204 to form a vacuum or partial vacuum (i.e., suction connection) when the locator 202 is in contact with a component (not shown). Other examples allow for the valve 212 to be any type of valve that can be closed and hold a vacuum or partial vacuum when the locators 202 are connected with the component (not shown). The valve 212 is in fluid communication with the opening 206b, and the valve 212 is housed within the channel 204. In other implementations, the valve 212 is positioned directly at the opening 206a so that a pumping station (e.g., FIG. 1C) is connectable directly to the valve 212. For example, the valve 212 may be affixed to an outside surface of the opening 206a.

The other valve 214 is positioned within the channel 204, and the valve 214 functions to allow fluid flow between the channel 204 and the external environment. In this example, the valve 214 is a check valve that allows fluids to enter the channel 204 so that a vacuum contained within the channel 204 is released. In other examples, the valve 214 is any other type of valve capable of holding the vacuum within the channel until a user desires to release the vacuum. For example, a twist valve (not shown) may be implemented that allows the user to simply open the valve 214 and allow fluids to flow into the channel 204. The valve 214 is in fluid communication with the opening 206c and is housed within the channel 204. In other examples, the valve 214 is positioned on or directly at the opening 206a so that a release mechanism can more easily contact the valve 214.

The valve 214 may be a check valve with a cracking pressure so that, when the channel 204 reaches a specified pressure, the valve 214 opens and allows air to flow inside of the channel 204 and release the vacuum or partial vacuum. The cracking pressure may be about 0.5 atm to about 10 atm or any value or range in between. For example, the cracking pressure may be 1.0 atm or more. Where the cracking pressure is 1.0 atm or more, an external pressure of 2.0 or more is exerted through one of the valves 212, 214 to release pressure within the channel 204 because the differential between an internal pressure of the channel 204 (i.e., the vacuum or partial vacuum) and the external pressure force exerted into the channel 204 should be at least 1.0 atm so that the pressure of the channel 204 can attain ambient conditions (i.e., about 1.0 atm). When cracking pressure is 1.0 atm or more and the differential between the internal pressure and the external pressure exerted is less than 1 atm at any point, the valves 212, 214 will not crack sufficiently, and a partial vacuum could remain within the channel 204, which may not allow a component (not shown) to disconnected from the carrier 200.

As shown in FIG. 2B, the valves 212, 214 have similar mechanical arrangements to function as one-way valves to move fluids either in (i.e., valve 214) or out (i.e., valve 212) of the channel 204. When the locator 202 and/or opening 206a are connected with a component (not shown), the valves 212, 214 in combination control the flow of fluids in and out of the channel 204 using a combination of balls 224a, 224b pressed by springs 226a, 226b against a conical pathway of the valve housings 228a, 228b. The springs 226a, 226b have a force sufficient to press the balls 224a, 224b against the conical portion. At the same time, the force is adequate to allow fluid flow to move the balls 224a, 224b away from the conical portion towards the opposite end of the springs 226a, 226b so that a vacuum can be formed or released within the channel 204. In other examples, one or both of the valves 212, 214 may be a two-way valve that has a manual release for controlling the flow of fluids.

Figure 2C:
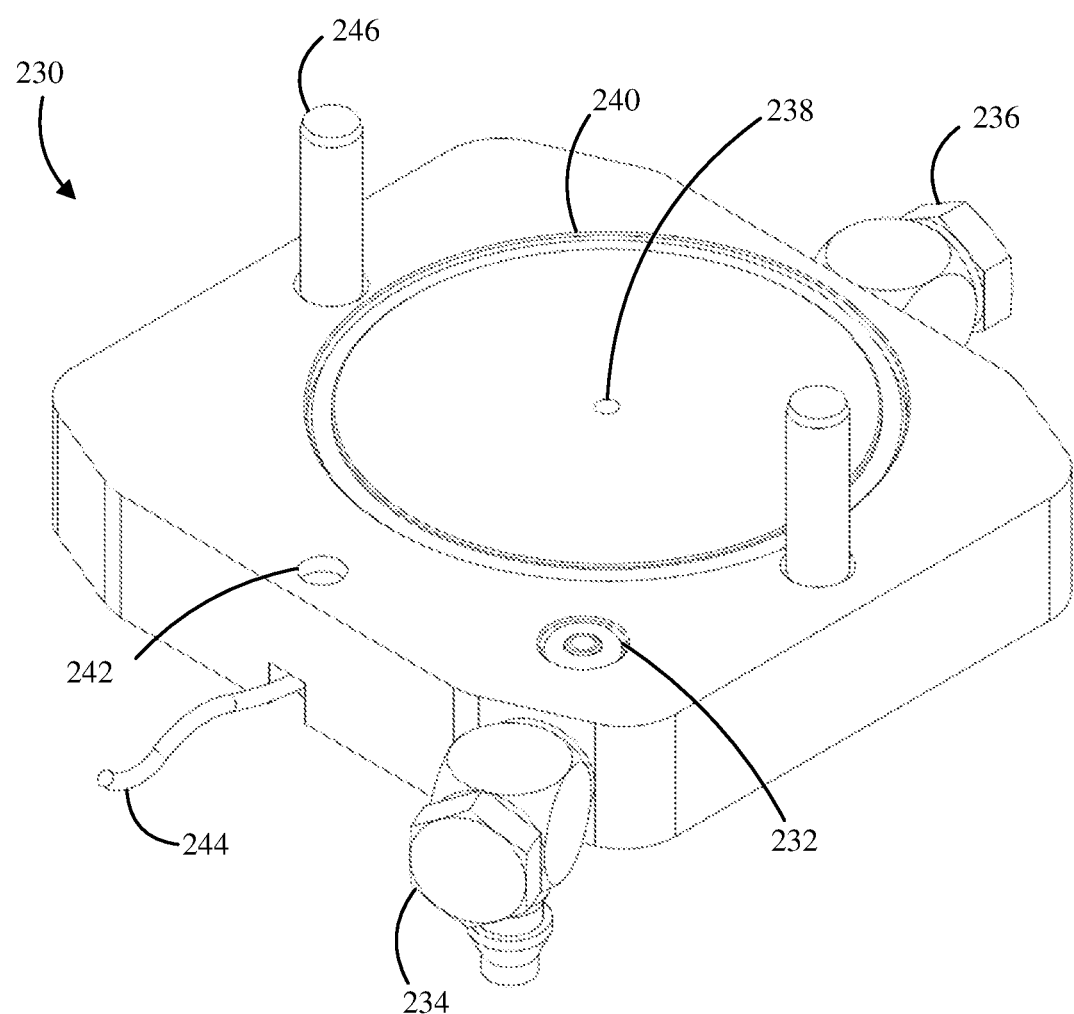
FIG. 2C is a perspective view of a detachment station used with the carrier of FIGS. 2A-2B.

FIG. 2C is a perspective view of a detachment station 230 used with the carrier 200 of FIGS. 2A-2B. As one example of using the valve 214 as a release mechanism for the vacuum forces, the detachment station 230 is connectable with the opening 206c at the pumping channel 232 so that fluids can be pumped into the channel 204 and, thus, releasing the suction connection between a component (not shown) and the openings 206a and/or locator 202. By pumping fluids into the channel 204 at the opening 206c and through the valve 214 at a pressure between 0.5 atm to about 10 atm, the valve 214 and/or valve 212 can the crack and steadily release fluids from the channel 204, which releases the vacuum or partial vacuum. The pumping channel 232 is connected with a pump 234 for a source of fluid flow to release the suction connection.

Another pump 236 is connected with another pumping channel 238, and the pumping channel 238 is configured to form a suction connection with the carrier 200 in combination with a seal 240 adjacent to the pumping channel 238 so that when the pump 234 is forcing fluids into the opening 206c the carrier 200 is prevented from shifting upward (i.e., perpendicularly from the detachment station 230) due to fluid flow from the pump 234. A proximity sensor 242, which may be similar to the proximity sensor 122 of FIG. 1C, is configured to detect whether the carrier 200 has contacted the detachment station 230 and whether it is appropriate to pump fluids through either of the pumping channels 232, 238. Dowels 246 are perpendicularly extending from the detachment station 230 and are configured to interface with the carrier 200 at slots (slots 116, 118 of FIG. 1A) so that the carrier 200 cannot shift laterally during any pumping.

Figure 3:
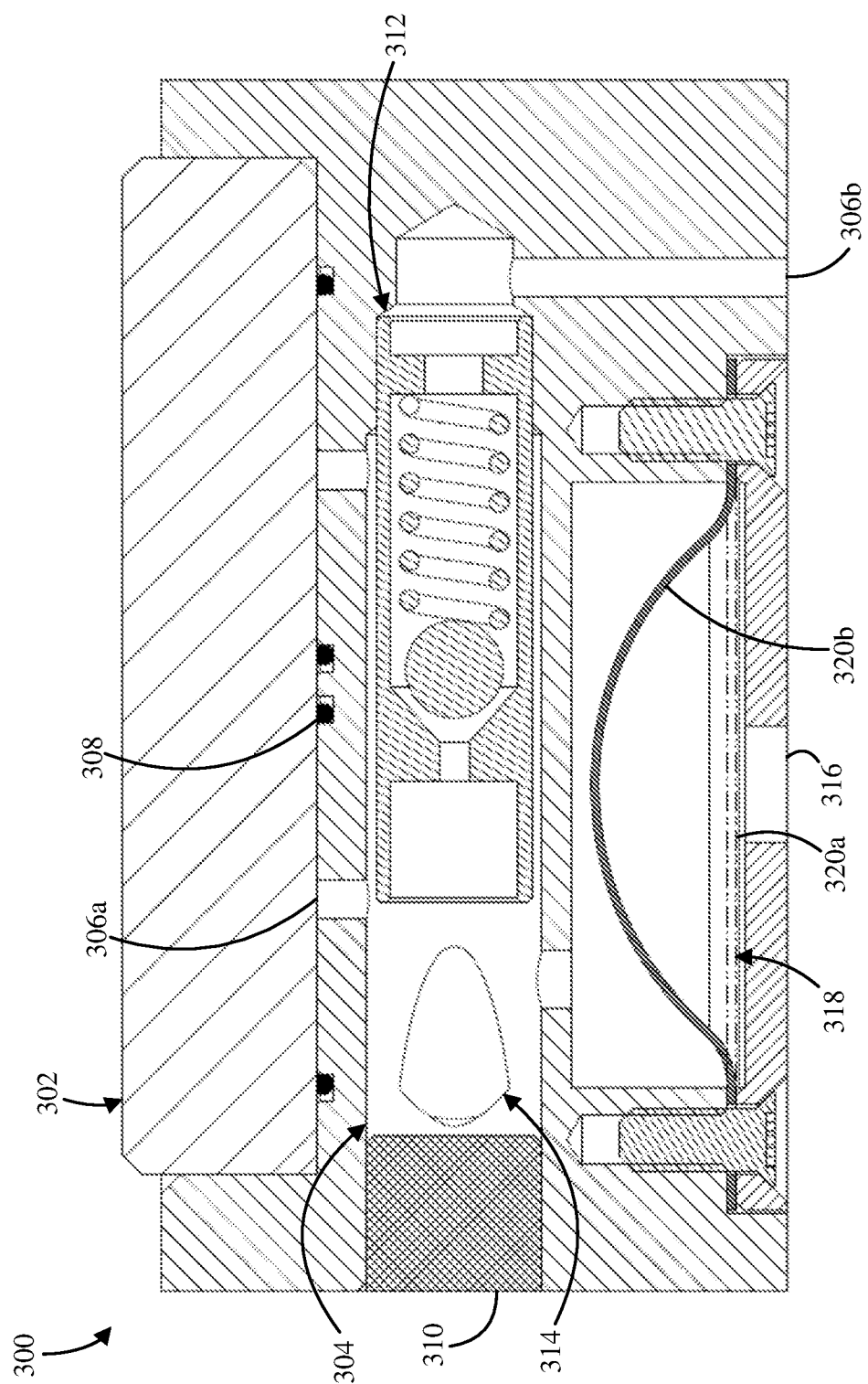
FIG. 3 is a cross-sectional view of another carrier similar to the carrier attached with a component along a similar line as the line IIA of FIG. 1B.

FIG. 3 is a cross-sectional view of another carrier 300 similar to the carrier 100 attached with a component 302 along a similar line as the line IIA of FIG. 1B. The carrier 300 includes a channel 304 that includes some of the components of the carrier 300. The component 302 is contacting the carrier 300 at openings 306a, which are in suction connection (i.e., vacuum or partial vacuum) to each other with assistance of seals 308. The seals 308 may be similar to any seal described herein. A plug 310 is secured within the channel 304, which may be similar to the plugs 210a, 210b of FIGS. 2A-2B. Also, within the channel 304, valves 312, 314, which may be similar to the valves 212, 214 of FIGS. 2A-2B, are included to regulate the flow of fluids in (i.e., valve 314) and out (i.e., valve 312) of the channel 304.

To enhance the vacuum or the partial vacuum within the channel 304, an opening 316 is separated from the channel 304 by a retaining mechanism 318 that is disposed within the channel 304. The retaining mechanism 318 may be similar in function as the vacuum retainer 216 of FIGS. 2A-2B so that a vacuum or partial vacuum is held for a longer period of time within the channel 304. The retaining mechanism 318 is arranged within the channel 304 to prevent fluid communication between the opening 316 and the channel 304. The retaining mechanism 318 is arranged as a diaphragm that can elastically deform according to the pressure of the channel 304 between a resting position 320a and deformed position 320b, or any other position in between the illustrated positions 320a, 320b.

As fluids are withdrawn from the channel 304, the retaining mechanism 318 deforms inward towards the channel 304 into a deformed position 320b, and thus, the volume of fluids within the channel 304 is reduced and pressure is increased within the system. During deformation towards the deformed position 320b, the opening 316 allows for fluids to flow from the external environment to the diaphragm of the retaining mechanism 318. As described in relation to FIGS. 2A-2B, the retaining mechanism 318, like the vacuum retainer 216, holds the vacuum or partial vacuum within the channel for extended periods of time, such as 12 hours to 21 days. When the component 302 is not connected with the openings 306a, the retaining mechanism 318 is at a rest position 320a where the retaining mechanism 318 lacks any substantially deformed portion.

The retaining mechanism 318 may be composed of any material sufficient to elastically and/or mechanically deform to hold a vacuum or partial vacuum within the channel 304. For example, the retaining mechanism 318 may be composed of any natural or synthetic rubber, like polyisoprene, chloroprene, nitrile rubber, butadiene, styrene-butadiene, or any combination thereof. The retaining mechanism 318 may have any thickness sufficient to deform and hold the deformation for an extended period of time. For example, the retaining mechanism may have a thickness of about $\frac{1}{32}$ inch to about $\frac{1}{4}$ inch.

Figure 4A:
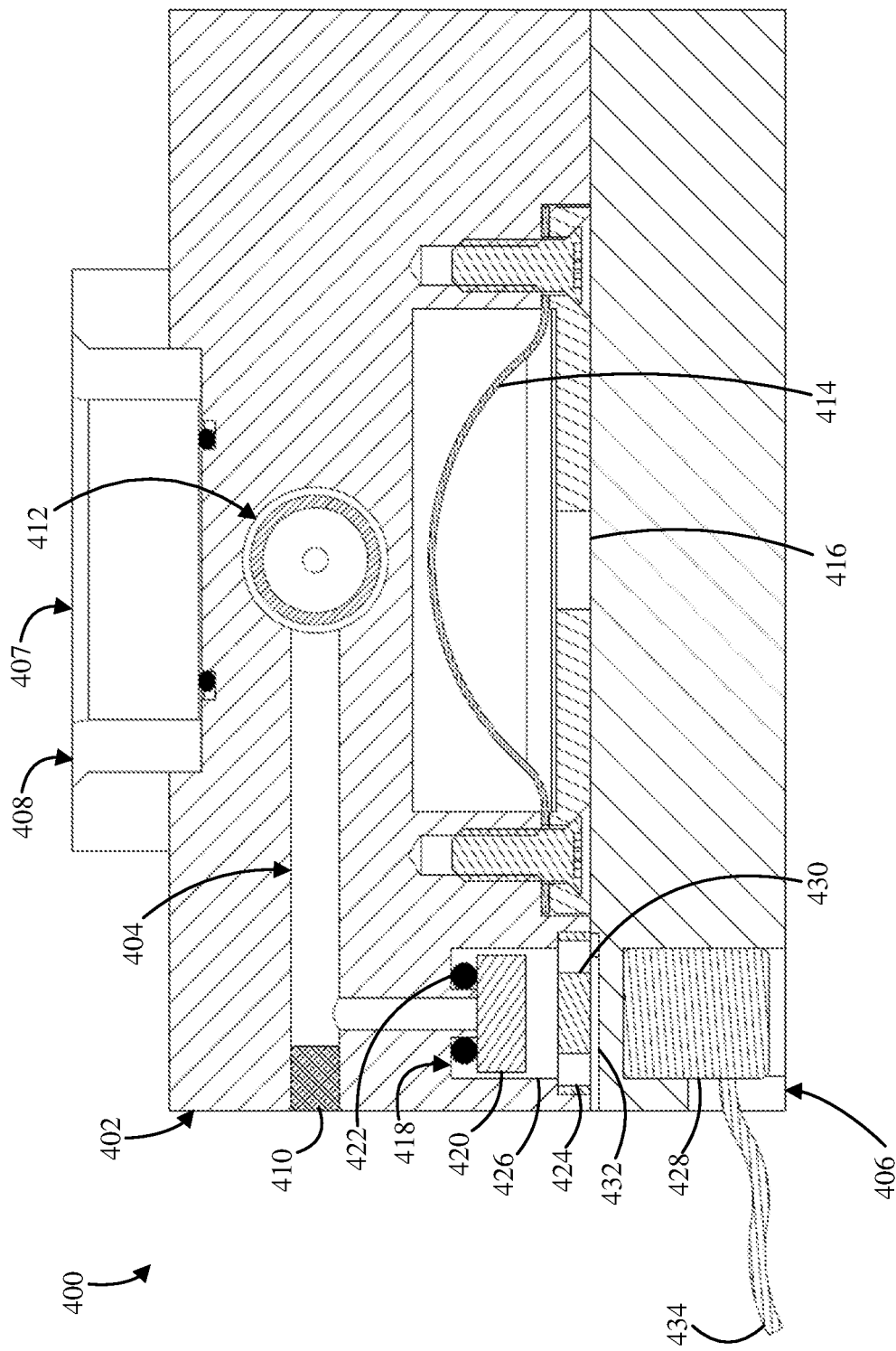
FIG. 4A is a cross-sectional view of another carrier as the carrier along a similar line as the line IVC of FIG. 1B.

FIG. 4A is a cross-sectional view of another carrier 400 that is similar to the carrier 102 along a similar line as the line IVC of FIG. 1B. The carrier 400 that includes a housing 402, and within the housing 402, a channel 404 is defined that has openings (not shown), which may be similarly arranged as the openings 306a, 306b of FIG. 3. Attached to a bottom surface of the housing 402, a detachment station 406 is in contact with the housing 402 for the purpose of detaching a component 407 from a locator 408 and the opening (not shown) on a top surface of the housing 402.

A plug 410, which may be similar to the plugs 210a, 210b, 310 of FIGS. 2A-3, is positioned to block the channel 404 when the component 407 is in a suction connection with the housing 402 from a vacuum being formed through a valve 412. The valve 412 may have similar configurations and functions as the valves 212, 312 of FIGS. 2A, 2B, and 3, which may include a similar opening (not shown) as the openings 208b and 308b.

To better retain the vacuum or partial vacuum created by withdrawing fluids through the valve 412, the vacuum retainer 414 is positioned within the channel 404 and above an opening 416 and is deformable similarly to how the retaining mechanism 318 functions and is arranged as described in FIG. 3. Although not shown, the vacuum retainer 414 is connected with the rest of the channel 404, including the valve 412 and a vacuum release mechanism 418.

The vacuum release mechanism 418 includes a magnet 420 that is in airtight contact with the channel 404 by seals 422, which may be similar to the seals 208, 221, 308 of FIGS. 2A and 3. The magnet 420 is moved against the seals 422 and the channel 404 by an inversely polarity magnet (magnet) that may be included on a pumping station, similar to the pumping station 104 of FIGS. 1A and 1C, and any other technique could be used to push the magnet 420 into contact with the channel 404 during pumping, such as a guiding rod or the like. As the vacuum or partial vacuum is created by withdrawing fluids through the valve 414, the magnet 420 is pushed against the seals 422, and once sufficient fluids have been withdrawn from the channel 404, a suction connection is created both between 1) the channel 404 and the magnet 420; and 2) the component 407 and channel 404. The carrier 400 is then in a state where a vacuum can be held for an extended period of time, as described herein.

To release the vacuum or partial vacuum when the housing 402 is connected with the component 407, the detachment station 406 is contacted with the bottom surface of the housing 402. At the point of contact below the magnet 420, openings 424 disposed at a magnet chamber 426 allow the fluids (i.e., air) to flow back into the magnet chamber 426 so that another magnet 428 can attract the magnet 420 away from the seals 422 and to a release wall 430. The magnet force to pull the magnet 420 away from the channel 404 should be sufficiently strong to pull the magnet 420 away from the vacuum or partial vacuum so that fluids can flow into the channel 404. To facilitate movement of fluids between the external environment and the magnet chamber 426, a pathway 432 is positioned a level below a top surface of the detachment station 406.

To activate the magnet 428, an electrical connection 434 provides electricity to the magnet 428 so that the release of the vacuum or partial vacuum from the channel can be easily controlled. For example, a user may want to check the position of the component 407 relative to a larger device (not shown) after contacting the detachment station 406 with the housing 402 and before breaking the suction connection to fully release the component 407.

The magnet 428 may be any type of magnet sufficient to release attract the magnet 420 from the channel 404. Similarly, the magnet 420 may be any magnet sufficient to be attracted away from the channel 404 upon engagement of the magnet 428. In some instances, the user may desire to have the suction connection be automatically released, and in that case, the magnet 428 may pull the magnet 420 away from the channel 404 upon contacting the detachment station 406 with the housing 402. In another example, no detachment station 406 is used, and the magnet 428 is handheld and/or attached to a workstation by an electric connection, similar to the electric connection 428, so that the user can simply pick up the magnet 428 and release the vacuum or partial vacuum from the channel 404.

Figure 4B:
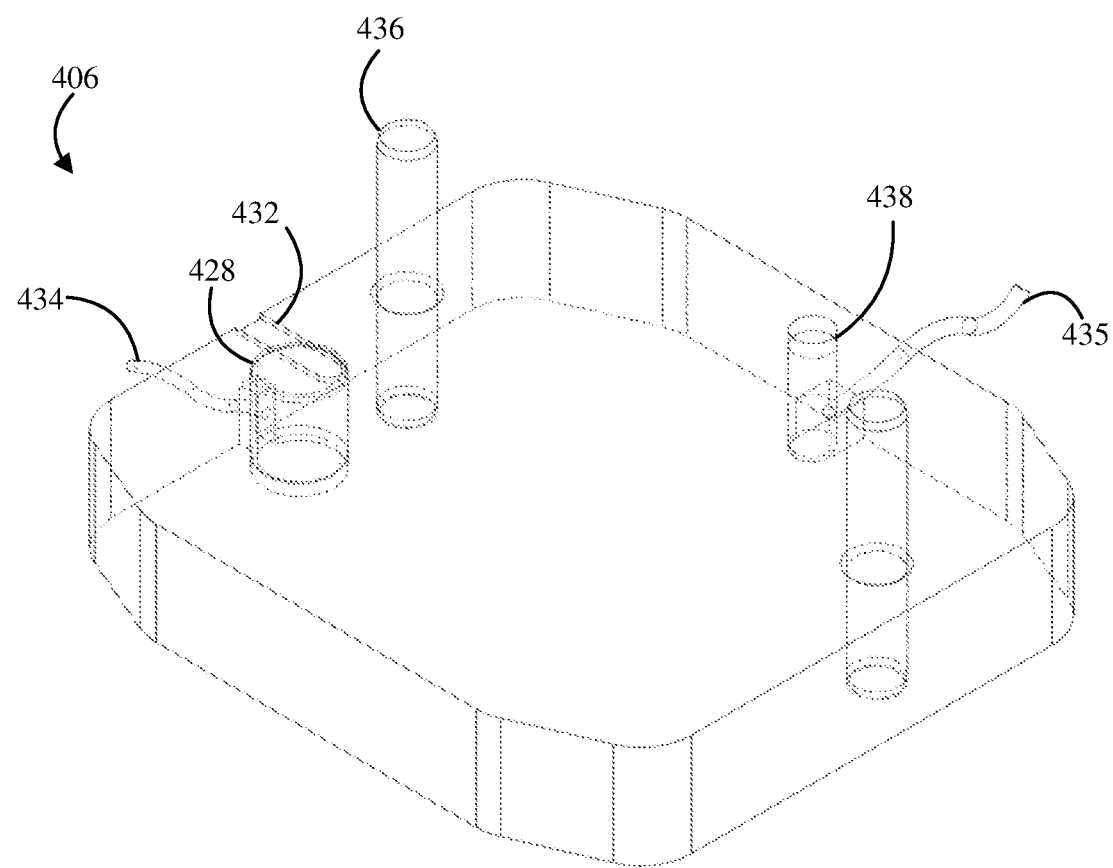
FIG. 4B is a perspective view of the detachment station of FIG. 4A.

FIG. 4B is a perspective view of the detachment station 406 of FIG. 4A. The detachment station 406 is shown as a transparent view to show the magnet 428, another electrical connection, dowels 436, and a proximity sensor 438. The dowels 436 may interface with slots (not shown) of the carrier 400 so that the carrier 400 does not laterally shift during the release of the vacuum or partial vacuum within the channel 404. The other electrical connection 435 provides power and a communication pathway to a device that can read whether the proximity sensor 438, which may be similar to the proximity sensor 122 of FIG. 1C, has detected the carrier 400 on the detachment station 406. The proximity sensor 438 may also detect whether the magnet 428 is sufficiently placed to engage and release the vacuum or partial vacuum within the channel 404. Under the pathway 432, the magnet 428 is integrated within the pumping station 106 so that when the magnet 428 is activated, fluids can pass through the pathway 432 to release the vacuum or partial vacuum within the channel 404.

In regards to other vacuum release mechanisms, besides the magnet system and the release check valve (i.e., valve 214, 314 of FIGS. 2A, 2B, 3), other release mechanisms that are manual or automatic could be used to release the vacuum within the channel. Any mechanism sufficient to release the vacuum could be used so long as the component would not be disturbed from connection with another device. For example, a solenoid activated lever or a differential vacuum could be used to release the vacuum. In other examples, a pin activated release valve could be used to release the vacuum or partial vacuum the valve. In another example, any type of actuated valve could be used to release the vacuum or partial vacuum.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus, comprising:
   a) a housing including a first opening and a second opening, the first opening configured to form a suction connection with a transportable component;
   b) a valve connected with the second opening;
   c) a channel defined within the housing, the channel extending between the first opening and the second opening; and
   d) a vacuum maintaining mechanism disposed within the channel, the vacuum maintaining mechanism configured to hold a partial vacuum within the channel, wherein the vacuum maintaining mechanism includes one or more of a diaphragm, a spring-piston, a foam, a rubber, any component sufficient to deform and store mechanical energy, or any combination thereof.

2. The apparatus of claim 1, wherein the housing includes a third opening connected with the channel, the third opening including a release mechanism configured to allow fluid to travel into the channel and to relieve a suction between the apparatus and the transportable component.

3. The apparatus of claim 2, wherein the release mechanism includes one or more of a check valve, an electromagnet, a twist release valve, a pin activated release, any type of force actuated valve, or any combination thereof.

4. The apparatus of claim 1, wherein the valve includes a check valve that is configured to restrict fluid flow once the suction connection is formed between the apparatus and the transportable component, or
   wherein the valve includes a sensor or is configured to connect with a sensor that detects whether the suction connection is formed between the apparatus and the transportable component.

5. The apparatus of claim 1, wherein the first opening includes a seal positioned on an outer surface of the housing, the seal configured to assist with the suction connection between the apparatus and the transportable component at the first opening.

6. The apparatus of claim 1, wherein the valve is a check valve configured to allow flow of fluids from the inside of the channel to an external environment so that a vacuum is formed within the channel.

7. The apparatus of claim 1, wherein when the apparatus is contacted with the transportable component at the first opening and is connected with a vacuum source at the valve, the valve is configured to form a partial vacuum within the channel having a pressure of about 0.01 atm to about 0.99 atm so that the suction connection is formed between the transportable component and the apparatus.

8. The apparatus of claim 1, wherein when the apparatus is contacted with the transportable component at the first opening and is connected with a vacuum source at the valve, the apparatus holds a vacuum or a partial vacuum with the transportable component when disconnected from the vacuum source.

9. The apparatus of claim 1, further comprising
e) locators positioned on an outer surface of the housing and proximate to the first opening, the locators configured to align to the shape of the transportable component and configured to assist with a suction connection between the apparatus and the transportable component.

10. An apparatus, comprising:
a) a housing defining a channel extending between a first opening, a second opening, and a third opening, the first opening configured to provide a suction connection between the apparatus and a component;
b) a valve connected with the second opening and configured to allow fluids to exit the channel;
c) a release mechanism positioned at the third opening and configured to relieve suction between the component and the apparatus upon engagement, wherein the release mechanism comprises an actuated element sealable against or within the third opening, the actuated element releasing the suction connection between the apparatus and the component when engaged with an actuation signal; and
d) a suction retention device disposed within the channel and configured to mechanically retain a vacuum within the channel.

11. The apparatus of claim 10, wherein the release mechanism is a check valve configured to crack under a pressure of about 1.0 atm or more so that the suction connection between the apparatus and the component is released.

12. The apparatus of claim 10, wherein the actuated element is a magnet sealable against or within the third opening, the magnet releasing the suction connection between the apparatus and the component when engaged with an electromagnetic force.

13. The apparatus of claim 12, wherein the third opening separates the channel and a release drain, the release drain including a fourth opening to the outside environment and a release wall, and
wherein when the magnet is engaged by attraction of an electromagnetic force, the magnet is pulled from the third opening to the release wall so that the suction connection between the apparatus and the component is released.

14. A system for carrying a component, comprising:
a) a carrier, comprising
i) a body defining a channel with a first opening and a second opening to an external environment, the first opening sealable against the component and capable of forming a suction connection between the carrier and the component;
ii) a check valve connected with the second opening and configured to withdraw fluids from the channel; and
b) a pumping station connectable with the carrier at the check valve, the pumping station configured to withdraw fluids from the channel,
wherein the pumping station or the check valve are configured to detect whether the suction connection has formed between the carrier and the component and to stop withdrawing fluids when the suction connection is formed, wherein the pumping station includes a sensor to detect whether the suction connection has formed between the carrier and the component, and wherein the pumping station is configured to stop withdrawing fluids once the suction connection is formed.

15. The system of claim 14, wherein the carrier further comprises
c) a release check valve positioned at a third opening of the channel, the release check valve configured to crack at a pressure of 1.0 atm or more and allow fluids to enter the channel so that the suction connection between the carrier and the component is released.

16. The system of claim 14, further comprising
c) locators disposed on an outer surface of the body and proximate to the first opening, the locators configured to position the component over the first opening to form or maintain a sealable connection at the first opening so that the suction connection is formable between the carrier and the component.

17. The system of claim 14, wherein the carrier further comprises
c) a vacuum retainer disposed within the channel, the vacuum retainer configured to mechanically maintain a partial vacuum within the channel, the vacuum retainer having a form that is elastic, and the vacuum retainer capable of retaining a partial vacuum within the channel by deforming as the pressure is lowered within the channel.

18. An apparatus, comprising:
a) a housing including a first opening and a second opening, the first opening configured to form a suction connection with a transportable component;
b) a valve connected with the second opening;
c) a channel defined within the housing, the channel extending between the first opening and the second opening;
d) a vacuum maintaining mechanism disposed within the channel, the vacuum maintaining mechanism configured to hold a partial vacuum within the channel; and
e) locators positioned on an outer surface of the housing and proximate to the first opening, the locators configured to align to the shape of the transportable component and configured to assist with a suction connection between the apparatus and the transportable component.

19. The apparatus of claim 18, wherein the vacuum maintaining mechanism includes one or more of a diaphragm, a spring-piston, a foam, a rubber, any component sufficient to deform and store mechanical energy, or any combination thereof.

20. The apparatus of claim 18, wherein the housing includes a third opening connected with the channel, the third opening including a release mechanism configured to allow fluid to travel into the channel and to relieve a suction between the apparatus and the transportable component.

21. The apparatus of claim 20, wherein the release mechanism includes one or more of a check valve, an electromagnet, a twist release valve, a pin activated release, any type of force actuated valve, or any combination thereof.

22. The apparatus of claim 18, wherein the valve includes a check valve that is configured to restrict fluid flow once the suction connection is formed between the apparatus and the transportable component, or
wherein the valve includes a sensor or is configured to connect with a sensor that detects whether the suction connection is formed between the apparatus and the transportable component.

23. The apparatus of claim 18, wherein the first opening includes a seal positioned on an outer surface of the housing, the seal configured to assist with the suction connection between the apparatus and the transportable component at the first opening.

24. The apparatus of claim 18, wherein when the apparatus is contacted with the transportable component at the first opening and is connected with a vacuum source at the valve, the valve is configured to form a partial vacuum within the channel having a pressure of about 0.01 atm to about 0.99 atm so that the suction connection is formed between the transportable component and the apparatus.

25. The apparatus of claim 18, wherein when the apparatus is contacted with the transportable component at the first opening and is connected with a vacuum source at the valve, the apparatus holds a vacuum or a partial vacuum with the transportable component when disconnected from the vacuum source.

* * * * *